US012573172B2

(12) United States Patent　　　(10) Patent No.:　US 12,573,172 B2
Peng et al.　　　　　　　　　　　　(45) Date of Patent:　Mar. 10, 2026

(54) IMAGE OUTPUTTING DEVICE AND IMAGE OUTPUTTING METHOD

(71) Applicant: Realtek Semiconductor Corp., HsinChu (TW)

(72) Inventors: Kang Peng, Suzhou City (CN); Gang Shen, Suzhou City (CN); Yang Lu, Suzhou City (CN); Dong-Yu He, Suzhou City (CN)

(73) Assignee: Realtek Semiconductor Corp., HsinChu (TW)

( * ) Notice: Subject to any disclaimer, the term of this patent is extended or adjusted under 35 U.S.C. 154(b) by 347 days.

(21) Appl. No.: 18/221,895

(22) Filed: Jul. 14, 2023

(65) Prior Publication Data

US 2024/0104887 A1　　Mar. 28, 2024

(30) Foreign Application Priority Data

Sep. 22, 2022　(CN) .......................... 202211157884.2

(51) Int. Cl.
| | |
|---|---|
| *G06V 10/56* | (2022.01) |
| *G06T 5/00* | (2024.01) |
| *G06T 5/70* | (2024.01) |
| *G06T 5/80* | (2024.01) |
| *G06T 9/00* | (2006.01) |
| *H04N 9/69* | (2023.01) |

(52) U.S. Cl.
CPC ................ *G06V 10/56* (2022.01); *G06T 5/70* (2024.01); *G06T 5/80* (2024.01); *G06T 9/00* (2013.01); *H04N 9/69* (2013.01); *G06T 2207/10024* (2013.01)

(58) Field of Classification Search
CPC .. G06V 10/56; G06T 5/80; G06T 5/70; G06T 9/00; G06T 2207/10024; H04N 9/69
See application file for complete search history.

(56) References Cited

U.S. PATENT DOCUMENTS

| | | | |
|---|---|---|---|
| 2015/0245050 A1* | 8/2015 | Tourapis | H04N 19/188 375/240.02 |
| 2017/0061236 A1* | 3/2017 | Pope | G06T 5/00 |

FOREIGN PATENT DOCUMENTS

| | | |
|---|---|---|
| CN | 110248096 B | 3/2021 |
| TW | 202226816 A | 7/2022 |

OTHER PUBLICATIONS

NPL: Results Publication Date Range: Oct. 31, 2000 to Aug. 5, 2025.*
NPL: IP.com and IEEE, Results Publication Date Range: Sep. 7, 1995 to Nov. 4, 2025.*

* cited by examiner

*Primary Examiner* — Quang N Vo
(74) *Attorney, Agent, or Firm* — Winston Hsu

(57) ABSTRACT

An image outputting device includes a sensing circuit for generating an image signal according to a configuration; a processing circuit, coupled to the sensing circuit, for performing an image processing on the image signal according to the configuration to generate an image processing result; and a controlling circuit, coupled to the sensing circuit and the processing circuit, for setting the configuration and entering an operating system after setting the configuration.

16 Claims, 4 Drawing Sheets

Transmitter
12

Receiver
14

IMAGE OUTPUTTING DEVICE AND IMAGE OUTPUTTING METHOD

BACKGROUND OF THE INVENTION

1. Field of the Invention

The present invention relates to a device and a method used in a communication system, and more particularly, to a device and a method for handling image processing.

2. Description of the Prior Art

A central processing unit (CPU) in a network camera enters an operating system so that associated hardware can output images. This requires a certain amount of time (usually not less than 2 seconds), meaning the network camera is not suitable for a scenario when the images must be output fast or instantaneously. This remains an important problem to be solved in the field.

SUMMARY OF THE INVENTION

The present invention therefore provides an image outputting device and image outputting method to solve the abovementioned problem.

An image outputting device comprises: a sensing circuit for generating an image signal according to a configuration; a processing circuit, coupled to the sensing circuit, for performing an image processing on the image signal according to the configuration to generate an image processing result; and a controlling circuit, coupled to the sensing circuit and the processing circuit, for setting the configuration and entering an operating system after setting the configuration.

An associated image outputting method comprises: generating an image signal according to a configuration; performing an image processing on the image signal according to the configuration to generate an image processing result; and setting the configuration and entering an operating system after setting the configuration.

An associated image outputting circuit comprises: a processing circuit, for performing an image processing on an image signal according to a configuration to generate an image processing result; and a controlling circuit, coupled to the processing circuit, for setting the configuration and entering an operating system after setting the configuration.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
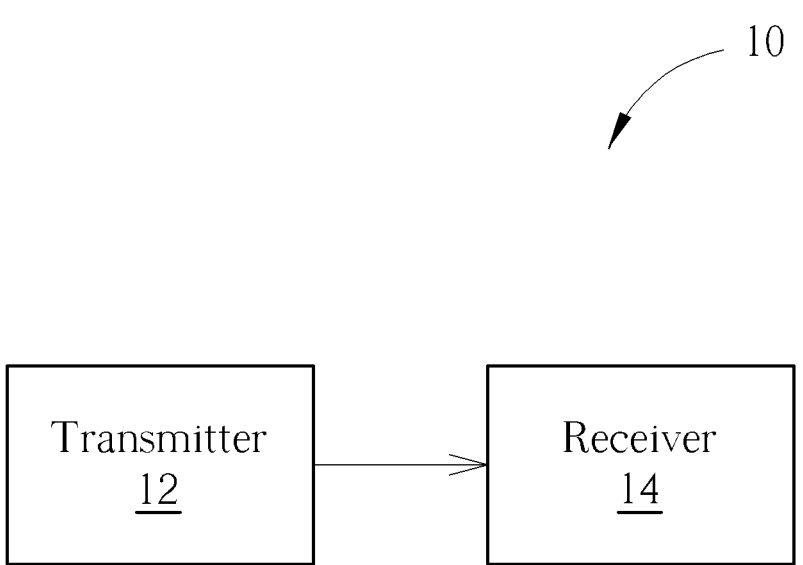
FIG. 1 is a schematic diagram of a communication system according to an example of the present invention.

FIG. 1 is a schematic diagram of a communication system 10 according to an example of the present invention. The communication system 10 may be any communication system using an orthogonal frequency-division multiplexing (OFDM) technique or a discrete multi-tone modulation (DMT) technique, and is composed of a transmitter 12 and a receiver 14. The communication system 10 may be any wired communication system such as an asymmetric digital subscriber line (ADSL) system, a power line communication (PLC) system or an Ethernet over coax (EOC), but is not limited herein. The communication system 10 may alternatively be any wireless communication system such as a wireless local area network (WLAN), a Digital Video Broadcasting (DVB) system, a Long Term Evolution (LTE) system, a Long Term Evolution-advanced (LTE-A) system or a fifth generation wireless system (5G), but is not limited herein. In addition, the transmitter 12 may comprise a device for transmitting data (e.g. images or video) such as an internet protocol camera (IPCAM) and a network camera, but is not limited herein. The receiver 14 may comprise a device for receiving and/or displaying data such as a mobile device, a laptop and a computer, but is not limited herein.

Figure 2:
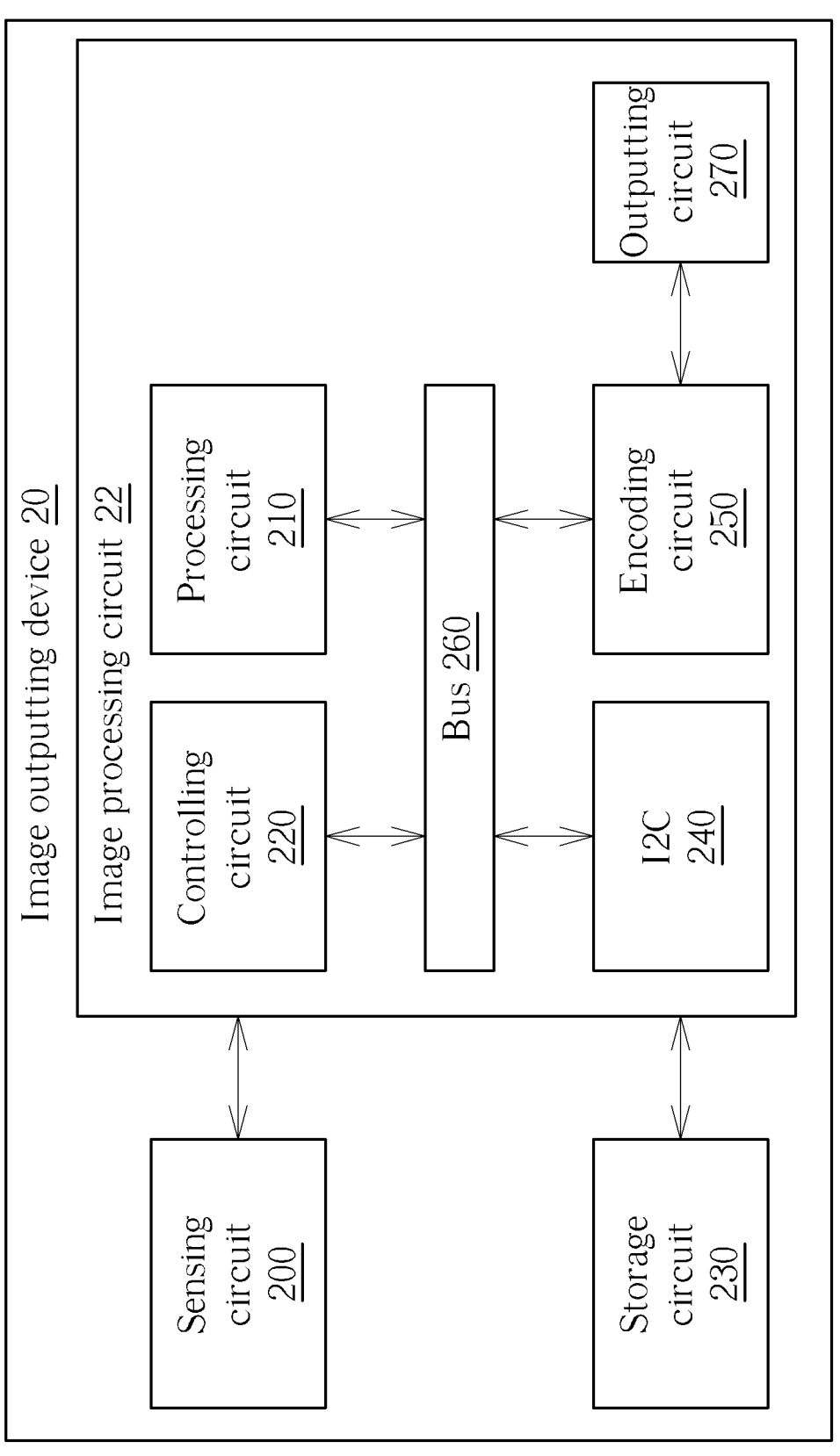
FIG. 2 is a schematic diagram of an image outputting device according to an example of the present invention.

FIG. 2 is a schematic diagram of an image outputting device 20 for outputting data according to an example of the present invention, and may be used in the transmitter 12. The image outputting device 20 may comprise a sensing circuit 200, a processing circuit 210 and a controlling circuit 220. In detail, the sensing circuit 200 may be for generating an image signal according to a configuration. The processing circuit 210 may be coupled to the sensing circuit 200, and may be for performing an image processing on the image signal according to the configuration to generate an image processing result. The controlling circuit 220 may be coupled to the sensing circuit 200 and the processing circuit 210, and may be for setting the configuration and entering an operating system after setting the configuration, wherein the controlling circuit 220 sets the configuration to the sensing circuit 200 and the processing circuit 210 before entering the operating system. The sensing circuit 200 and the processing circuit 210 generate the image signal, generate the image processing result and store the image processing result in parallel (e.g. synchronously), when the controlling circuit 220 enters the operating system. Therefore, the controlling circuit 220 may obtain the image processing result directly without waiting for the sensing circuit 200 and the processing circuit 210 to generate the image signal, to generate the image processing result and to store the image processing result. The controlling circuit 220 may further process (such as compress, encode or output) the image processing result.

In one example, the sensing circuit 200 may comprise a camera. The sensing circuit 200 may comprise an image sensor such as a charge coupled device (CCD) sensor or a complementary metal-oxide semiconductor (CMOS) sensor, but is not limited herein. In one example, the sensing circuit 200 may receive a light signal (e.g. via a lens) and may transform the light signal into the image signal according to the configuration. In detail, the light signal may be transformed into an analog electronic signal. The analog electronic signal may be transformed into the image signal via an analog to digital converter in the image outputting device 20. The image signal may be a digital signal.

In one example, the processing circuit 210 may be for processing the image signal generated by the sensing circuit 200. The processing circuit 210 may comprise an image signal processor (ISP), but is not limited herein. The controlling circuit 220 may comprise a central processing unit (CPU), but is not limited herein.

In one example, the configuration is stored in a register in the sensing circuit 200 and a register in the processing circuit 210. In one example, the configuration is for setting at least one register (e.g. an initial register) of the sensing circuit 200 so that the sensing circuit 200 outputs the image signal. In one example, the configuration is for setting at least one register of an image processor of the processing circuit 210 to perform an image signal processing. In one example, the configuration comprises a parameter(s) related to an exposure, an image output size and a start image output, but is not limited herein. In one example, the configuration comprises a parameter(s) related to the image processor (e.g. statistical limit, image settings), such as a black level correction, a Gamma correction and other parameters, but is not limited herein.

In one example, the image outputting device 20 may comprise an Inter-Integrated Circuit (I2C) 240. The I2C 240 may be coupled to the controlling circuit 220, the sensing circuit 200 and the processing circuit 210, and may be for transmitting (forwarding) the configuration (e.g. to the sensing circuit 200 and the processing circuit 210), wherein the configuration is for setting at least one register, but is not limited herein. That is, the controlling circuit 220 may set the configuration to the sensing circuit 200 and the processing circuit 210 via the I2C 240 to control operations of the sensing circuit 200 and the processing circuit 210. For example, the controlling circuit 220 may control the sensing circuit 200 to generate the image signal, by accessing the at least one register. The controlling circuit 220 may control the processing circuit 210 to perform the image processing on the image signal to generate the image processing result, by accessing the at least one register. In one example, the controlling circuit 220 may set the configuration to the sensing circuit 200 and the processing circuit 210 via the I2C 240, i.e. establish a communication of the I2C 240, when the image outputting device 20 is connected to a power supply and a system starts (e.g. initializes).

In one example, the image outputting device 20 may further comprise a storage circuit 230. The storage circuit 230 may be coupled to the processing circuit 210, and may be for storing the image processing result. The controlling circuit 220 may apply for a storage space of the storage circuit 230, when the system starts. The system may comprise a system on chip (SOC), but is not limited herein. The storage circuit 230 may comprise a double data rate (DDR) memory, such as DDR synchronous dynamic random access memory (DDR SDRAM) of various generations, but is not limited herein. In one example, the image outputting device 20 may further comprise an encoding circuit 250. The encoding circuit 250 may be coupled to the controlling circuit 220 and the storage circuit 230, and may be for encoding the image processing result according to a control of the controlling circuit 220 to generate an encoded image processing result. The encoding circuit 250 may encode the image processing result according to an encoding standard (e.g. a high efficiency video coding (HEVC), but not limited herein). In one example, the image outputting device 20 may further comprise an outputting circuit 270. The outputting circuit 270 may be coupled to the encoding circuit 250, and may be for outputting (e.g. transmitting) the encoded image processing result (e.g. to the receiver 14 in FIG. 1). The outputting circuit 270 may comprise a video driver circuit.

In one example, the image outputting device 20 may further comprise a bus 260. The bus 260 may be simultaneously connected with the processing circuit 210, the controlling circuit 220, the I2C 240 and/or the encoding circuit 250, meaning the processing circuit 210, the controlling circuit 220, the I2C 240 and/or the encoding circuit 250 may interact with each other (e.g. transmit/receive data, configuration, message, signal, read command or write command) via the bus 260.

In one example, the processing circuit 210 may trigger an interrupt, after generating the image processing result. In addition, the processing circuit 210 may transmit the image processing result to the storage circuit 230 or may obtain the image processing result from the storage circuit 230, via a direct memory access (DMA). The image processing result may comprise image data of a frame. In this case, the controlling circuit 220 may enter the operating system in parallel. In one example, the storage circuit 230 may store image data of four frames (e.g. from the processing circuit 210).

In one example, an image quality may be adjusted (e.g. improved), an image may be restored and/or the image may be enhanced, via the image processing. The image processing may comprise at least one of a white balance correction, a black level correction, a lens correction, a color correction, a Gamma correction or a noise reduction, but is not limited herein. In one example, a format of the image processing result may comprise a video format, wherein the video format may comprise YUV420 or YUV422, but is not limited herein. In one example, the operating system may comprise a Linux operating system, but is not limited herein.

Figure 3:
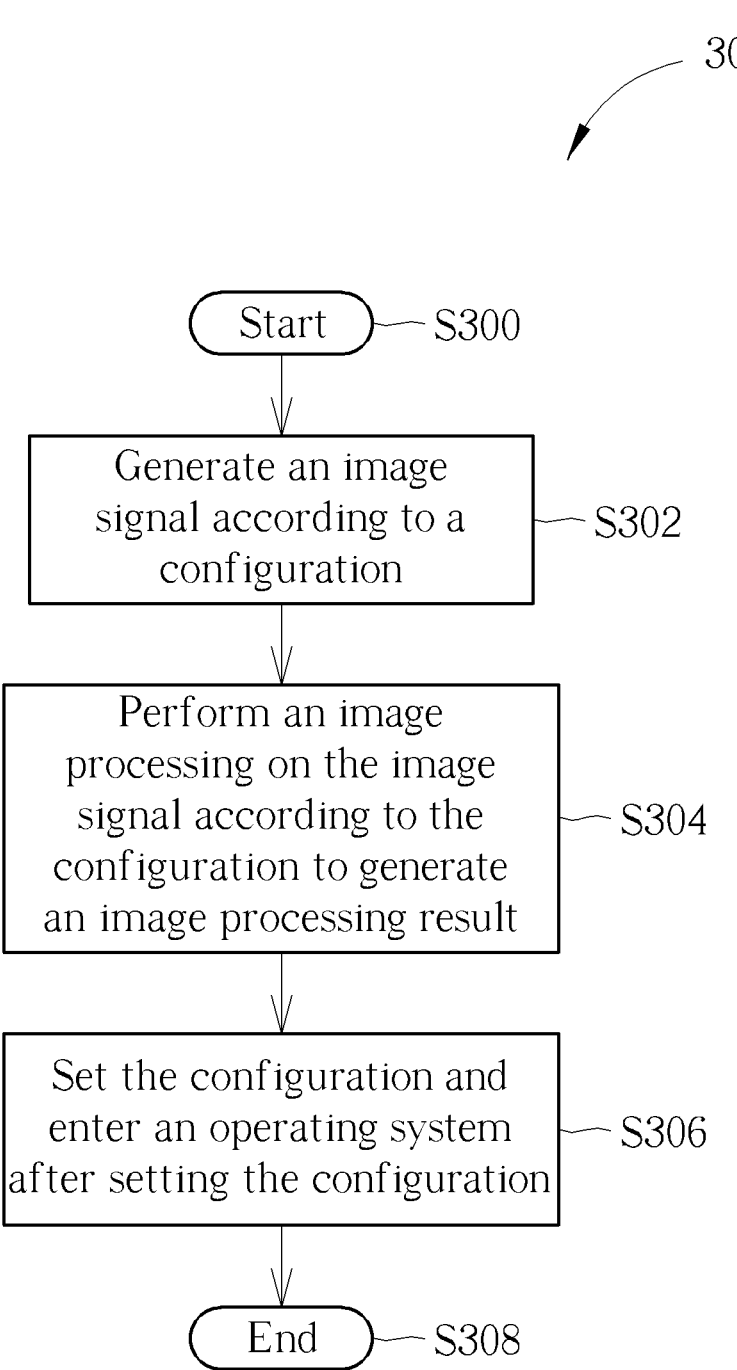
FIG. 3 is a flowchart of a process according to an example of the present invention.

Operations of the image outputting device 20 in the above examples can be summarized into a process S30 shown in FIG. 3, which may be used in the transmitter 12 in FIG. 1. The process S30 includes the following steps:

Step S300: Start.

Step S302: Generate an image signal according to a configuration.

Step S304: Perform an image processing on the image signal according to the configuration to generate an image processing result.

Step S306: Set the configuration and enter an operating system after setting the configuration.

Step S308: End.

Detailed description and variations of the process S30 can be known by referring to the previous description, and are not narrated herein.

Figure 4:
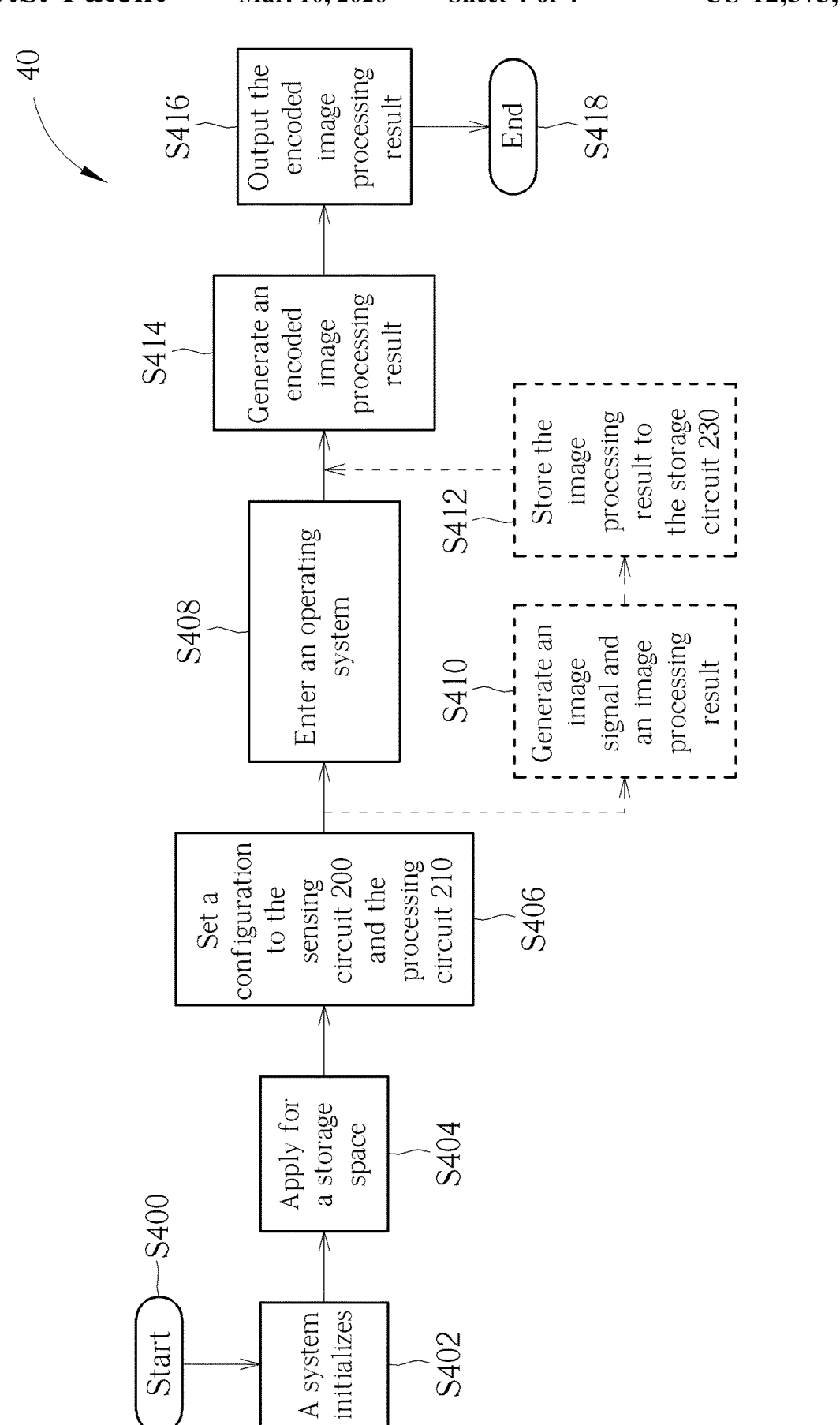
FIG. 4 is a flowchart of a process according to an example of the present invention.

Operations of the image outputting device 20 in the above examples can be further summarized into a process S40 shown in FIG. 4, which may be used in the transmitter 12 in FIG. 1. The process S40 includes the following steps:

Step S400: Start.

Step S402: A system of the image outputting device 20 initializes.

Step S404: The controlling circuit 220 applies for a storage space of the storage circuit 230.

Step S406: The controlling circuit 220 sets a configuration to the sensing circuit 200 and the processing circuit 210.

Step S408: The controlling circuit 220 enters an operating system.

Step S410: The sensing circuit 200 generates an image signal according to the configuration, and the processing circuit 210 performs an image processing on the image signal according to the configuration to generate an image processing result.

Step S412: The processing circuit 210 stores the image processing result to the storage circuit 230.

Step S414: The controlling circuit 220 obtains the image processing result from the storage circuit 230, and controls the encoding circuit 250 to generate an encoded image processing result.

Step S416: The outputting circuit 270 outputs (e.g. transmits) the encoded image processing result (e.g. to the receiver 14 in FIG. 1).

Step S418: End.

According to the process S40, the controlling circuit 220 sets the configuration to the sensing circuit 200 and the processing circuit 210 (Step S406). Thus, the steps when the controlling circuit 220 enters the operating system (Step S408), the sensing circuit 200 generates the image signal according to the configuration and the processing circuit 210 generates the image processing result according to the configuration (Step S410), and the processing circuit 210 stores the image processing result to the storage circuit 230 (Step S412) may be performed in parallel. After performing Step S408, the controlling circuit 220 may perform Step S414 directly without waiting for step S410 and step S412 to be performed.

Detailed description and variations of the process S40 can be known by referring to the previous description, and are not narrated herein.

The operations of "output", "compute", "calculate", "generate" and "transmit" described above may be replaced with each other. The term of "according to" described above may be replaced by the term of "via" or "by using". The term of "comprise" described above may be replaced by the term of "is". The term of "image" described above may be replaced by the term of "video".

It should be noted that realizations of the image outputting device 20 (and the circuits in the image outputting device 20) are various. For example, the circuits mentioned above may be integrated into at least one circuit. For example, the processing circuit 210, the controlling circuit 220, the I2C 240, the encoding circuit 250, the bus 260 and the outputting circuit 270 may be comprised in an image processing circuit 22. In addition, the image outputting device 20 and the circuits in the image outputting device 20 may be realized by hardware (e.g. circuits), software, firmware (known as a combination of a hardware device, computer instructions and data that reside as read-only software on the hardware device), an electronic system or a combination of the devices mentioned above, but are not limited herein.

To sum up, the present invention provides an image outputting device and an image outputting method. According to the present invention, the controlling circuit 220 may set the configuration to the sensing circuit 200 and the processing circuit 210, before entering the operating system. The controlling circuit 220 entering the operating system and the sensing circuit 200 and the processing circuit 210 outputting images can be performed in parallel. Thus, after the controlling circuit 220 enters the operating system, it does not need to wait for the sensing circuit 200 and the processing circuit 210 to generate the images. The time taken by the image outputting device 20 to output the images may be improved (e.g. within 200 milliseconds), which is suitable for the scenario of outputting the images fast or instantaneously.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image outputting device for improving a time to output an image, comprising:
   a sensing circuit, for generating an image signal according to a configuration;

a processing circuit, coupled to the sensing circuit, for performing an image processing on the image signal according to the configuration to generate an image processing result;
   a controlling circuit, coupled to the sensing circuit and the processing circuit, for setting the configuration and entering an operating system after setting the configuration;
   a storage circuit, coupled to the processing circuit, for storing the image processing result;
   an encoding circuit, coupled to the controlling circuit and the storage circuit, for encoding the image processing result according to a control of the controlling circuit to generate an encoded image processing result; and
   an outputting circuit, coupled to the encoding circuit, for outputting the encoded image processing result;
   wherein when the step of the controlling circuit entering the operating system, the steps of the sensing circuit and the processing circuit generating the image signal, generating the image processing result and storing the image processing result are performed in parallel.

2. The image outputting device of claim 1, wherein the sensing circuit further performs the following operation:
   receiving a light signal and transforming the light signal into the image signal according to the configuration.

3. The image outputting device of claim 1, further comprising:
   an Inter-Integrated Circuit (I2C), for transmitting the configuration, wherein the configuration is for setting at least one register.

4. The image outputting device of claim 3, wherein the controlling circuit further performs the following operation:
   controlling the processing circuit to perform the image processing on the image signal to generate the image processing result, by accessing the at least one register.

5. The image outputting device of claim 1, wherein the processing circuit further performs the following operation:
   transmitting the image processing result to the storage circuit via a direct memory access (DMA).

6. The image outputting device of claim 1, wherein the image processing comprises at least one of a white balance correction, a black level correction, a lens correction, a color correction, a Gamma correction or a noise reduction.

7. The image outputting device of claim 1, wherein a format of the image processing result comprises a video format.

8. The image outputting device of claim 1, wherein the operating system comprises a Linux operating system.

9. An image outputting method for improving a time to output an image, comprising:
   generating an image signal according to a configuration;
   performing an image processing on the image signal according to the configuration to generate an image processing result;
   setting the configuration and entering an operating system after setting the configuration;
   storing the image processing result;
   encoding the image processing result according to a control of the controlling circuit to generate an encoded image processing result; and
   outputting the encoded image processing result;
   wherein when the step of entering the operating system, the steps of generating the image signal, generating the image processing result and storing the image processing result are performed in parallel.

10. An image outputting circuit for improving a time to output an image, comprising:

a processing circuit, for performing an image processing on an image signal according to a configuration to generate an image processing result; and a controlling circuit, coupled to the processing circuit, for setting the configuration and entering an operating system after setting the configuration;

an encoding circuit, coupled to the controlling circuit, for encoding the image processing result according to a control of the controlling circuit to generate an encoded image processing result; and an outputting circuit, coupled to the encoding circuit, for outputting the encoded image processing result;

wherein the step of the controlling circuit entering the operating system, the steps of the processing circuit generating the image signal, generating the image processing result and storing the image processing result are performed in parallel.

11. The image outputting circuit of claim 10, further comprising:

an Inter-Integrated Circuit (I2C), for transmitting the configuration, wherein the configuration is for setting at least one register.

12. The image outputting circuit of claim 11, wherein the controlling circuit further performs the following operation:

controlling the processing circuit to perform the image processing on the image signal to generate the image processing result, by accessing the at least one register.

13. The image outputting circuit of claim 10, wherein the processing circuit further performs the following operation:

transmitting the image processing result to a storage circuit via a direct memory access (DMA).

14. The image outputting circuit of claim 10, wherein the image processing comprises at least one of a white balance correction, a black level correction, a lens correction, a color correction, a Gamma correction or a noise reduction.

15. The image outputting circuit of claim 10, wherein a format of the image processing result comprises a video format.

16. The image outputting circuit of claim 10, wherein the operating system comprises a Linux operating system.

\*    \*    \*    \*    \*